(12) United States Patent
Škutchanová

(10) Patent No.: US 8,790,749 B2
(45) Date of Patent: Jul. 29, 2014

(54) METHOD FOR PROVIDING A GRINDING SURFACE ON GLASS IMPLEMENTS USED IN PERSONAL CARE

(76) Inventor: Zuzana Škutchanová, Prague (CZ)

( * ) Notice: Subject to any disclaimer, the term of this patent is extended or adjusted under 35 U.S.C. 154(b) by 0 days.

(21) Appl. No.: 13/641,346

(22) PCT Filed: Apr. 12, 2011

(86) PCT No.: PCT/CZ2011/000034
§ 371 (c)(1),
(2), (4) Date: Oct. 15, 2012

(87) PCT Pub. No.: WO2011/127873
PCT Pub. Date: Oct. 20, 2011

(65) Prior Publication Data
US 2013/0029039 A1    Jan. 31, 2013

(30) Foreign Application Priority Data
Apr. 16, 2010   (CZ) .................................... 2010-302

(51) Int. Cl.
*B05D 1/12* (2006.01)
*B05D 3/02* (2006.01)

(52) U.S. Cl.
USPC ......... 427/204; 427/201; 427/202; 427/397.7

(58) Field of Classification Search
USPC ................. 427/201, 202, 204, 397.7
See application file for complete search history.

(56) References Cited

U.S. PATENT DOCUMENTS

| 2,592,954 | A | * | 4/1952 | Robie | ............................. 51/298 |
| 6,145,512 | A |   | 11/2000 | Daley | |
| 2002/0066459 | A1 | * | 6/2002 | Turina | ........................ 132/76.4 |
| 2009/0025744 | A1 | * | 1/2009 | Jensen | ........................ 132/76.4 |

FOREIGN PATENT DOCUMENTS

DE    102005013387    9/2006

OTHER PUBLICATIONS

English Abstract of DE 102005013387.

* cited by examiner

*Primary Examiner* — Frederick Parker
(74) *Attorney, Agent, or Firm* — Dykema Gossett PLLC

(57) ABSTRACT

Manufacturing method of grinding surface on glass cosmetics, in particular the nail and skin file, from flat glass of FLOAT type, is carried out by marking at least one abrasive surface on one or two sides of a glass pane or intermediate product. This surface is then coated with fusing glue, powdered with clean quartz sand with grain size between 1 and 500 μm using a sieve, and the surplus sand is knocked-down. The intermediate product with fixed sand is inserted into the fusing furnace where it is baked at the temperature of up to 900° C. The abrasive surface may be roughened by sand blasting before the fusing glue application; the intermediate product coated with fusing glue can be decorated with glass fritte.

9 Claims, No Drawings

METHOD FOR PROVIDING A GRINDING SURFACE ON GLASS IMPLEMENTS USED IN PERSONAL CARE

FIELD OF THE INVENTION

The invention relates to a manufacturing method for providing a grinding surface on glass products (implements) used in cosmetics, in particular nail and rough skin files, manufactured from flat glass of FLOAT type.

BACKGROUND OF THE INVENTION

Various tools are used to polish and file nails or to remove rough skin. Metallic files and scrapers, abrasive paper-based files, or products manufactured from glass are currently becoming more and more popular. Compared to products of other materials, these offer several advantages, the most important one being the possibility of their cleaning and elimination of unfavorable impact on the filed nail, i.e., no nail fraying occurs. Glass files satisfy the high hygienic demands relating to all cosmetic procedures—this is very important for their use in public facilities. Various technologies of nail file roughing exist—the abrasive surfaces of the first nail files were achieved by mechanical roughing. Chemical surface etching is frequently used. In this case, a strip of glass is first roughened by chemical etching and subsequently hardened. The abrasive surface roughness is 10 to 100 micrometers. Also nail files with very fine surfaces below 10 micrometers have been manufactured thanks to subsequently used glass hardening technology. Such products have a substantial disadvantage—large volumes of hazardous chemicals are used in the production process. Considering the increasingly strict conditions of hygienic regulations and occupational safety issues, the costs of corresponding workplace quality assurance, and in particular the costs relating to disposal of used chemicals, are significant. It is generally known that the technological process of surface etching is based on the chemical interaction between hydrofluoric acid and fluorides on the surface of the glass element. Achieving various roughness levels on the same product is a complicated process. The disadvantage of extra-fine nail files is that their surface is often clogged by the ground material.

Alternative methods of surface roughing are based on fixing various sand types to the glass surface by acid or on fine sands fixing with glue and subsequent hardening with UV light. However, this method does not guarantee the required product quality. Sooner or later the abrasive surface is worn-off during usage and the nail file loses its function.

SUMMARY OF THE INVENTION

The above-mentioned disadvantages are eliminated by the manufacturing method of grinding surfaces on glass devices (e.g., implements) used in cosmetics, in particular the nail and skin file from flat glass of FLOAT type according to the invention, which consists in one or two sides of glass pane or intermediate product with at least one marked abrasive surface, which is subsequently coated with fusing (fixing) glue, powdered with clean quartz sand with grain size 1-500 µm using a sieve, surplus sand is knocked-down, the intermediate product with fixed sand is inserted into the fusing furnace where it is baked at the temperature of up to 900° C., and the cooled intermediate product is rinsed with water. An advantage is that the abrasive surface can be roughened by sand blasting before the fusing glue application. Another advantage is that either working or non-working surface can be decorated with glass frit after the fusing glue application. Another important aspect is that the abrasive surface of the device can be symmetric, asymmetric, or décor-shaped. At least two abrasive surfaces may be marked on one side of the device in advance. Glue spreading and sand application are carried out twice, either on one side or on both sides of the device, always with a different sand grain size. The principle furthermore consists in marking the abrasive surface on both sides of the device and applying quartz sand with different grain sizes. Whenever a single device is used as the intermediate product, the abrasive surface is marked on the sides of the device and quartz sand is applied. If the glass pane is used as the initial intermediate product, it is cut into strips once removed from the fusing furnace and the strips are then processed into the shape of nail files.

The advantage of the new method of manufacturing the abrasive surface of the glass implement used in cosmetics consists in fusing method usage—the abrasive surface is formed either on a single intermediate product or on whole glass pane which is subsequently cut into pieces. Fusing can also be used to decorate the cosmetic device in one operation. Usage of this method offers a great variability of abrasive surfaces design and is easier to manufacture compared to the currently used methods. Last but not least, the advantage of this method also consists in the safety and hygiene of the manufacturing process as no chemical substances are required unlike in case of the etching process. The products manufactured using the described method have much longer durability compared to the layers which are only hardened with UV light.

DESCRIPTION OF THE PREFERRED EMBODIMENT

Generally, the technological procedure of the glass cosmetic device's abrasive surface production is the following. Grip area and the working surface are marked on the device. Such marked working surface is coated with fusing glue using either a paintbrush or a roller and clean quartz sand with grain size between 1 and 500 µm is applied with a sieve. An advantage is that the abrasive surface can be roughened by sand blasting before the fusing glue application. The surplus sand, which does not stick to the glue, is knocked-down and the device is inserted into the fusing furnace. Baking in this furnace takes place according to the fusing baking curve at maximum temperatures between 760° C. and 860° C. The baking process lasts at least 420 minutes.

Glass quartz sands are available in several grain types, wherein each type contains different particle sizes. Three types of glass sands are advantageously used for abrasive surface production.

For example, considering the designations introduced by Sklopísky Střelec a.s., a leading glass sands manufacturer in the Czech Republic, the following sand types would be used:

glass sand—this sand is designated as ST 08 through to ST 40, numbers refer to the quantity of Fe. These sands have the same grain size from 1 µm to 500 µm. The sand with these particle sizes can be conveniently used for production of abrasive surfaces of pedicure equipment.

fine glass sand—the grain size of these sands is mentioned to be between 1 µm and 200 µm (STJ 08-STJ 25). These sands are also suitable for production of abrasive surfaces of pedicure equipment.

micronized sands—three grain size values are indicated for this sand—the sand is suitable for the above-mentioned method of glass cosmetic device for manicure.

1. 1-30 µm ST2
2. 1-20 µm ST6
3. 1-15 µm ST8

Example 1

Intermediate products (future nail files) are cut out from FLOAT glass plane. Four centimeters from the end are kept as the grip while the fusing glue is applied to the remaining surface using a roller. The glue is then powdered with glass sand with grain size of 1-300 μm using a sieve. The sand is fixed to the surface and the excessive sand is knocked-down. The intermediate products are inserted into the fusing oven and baked for eight hours—of that, for ten minutes at the temperature of up to 850° C. The finished nail file is rinsed with water after cooling.

Example 2

Intermediate products (future nail files) are cut out from FLOAT glass plane. Four centimeters from the end are kept as the grip, the remaining surface is sand blasted and the fusing glue is then applied using a roller. The glue is then powdered with glass sand using a sieve. The sand is fixed to the surface and the excessive sand is knocked-down. The other side of the device is decorated with glass frit. The intermediate products are inserted into the fusing oven and baked for eight hours—of that, for ten minutes at the temperature of up to 850° C. The finished nail file is rinsed with water after cooling.

Example 3

Intermediate products (future nail files) are cut out from FLOAT glass plane. Four centimeters from the end are kept as the grip, fusing glue is applied on the surfaces and edges of the intermediate product, which will form the abrasive surface, using a paintbrush. The glue is then powdered with glass sand 1-20 μm using a sieve. The sand is fixed to the surface and the excessive sand is knocked-down. The intermediate products are inserted into the fusing oven and baked for eight hours—of that, for twelve minutes at the temperature of up to 860° C. The finished nail file is rinsed with water after cooling.

Example 4

Intermediate products (future nail files) are cut out from FLOAT glass plane. Four centimeters from the end are kept as the grip. Three horizontal strips are marked on the remaining surface intended for the abrasive surface. Glue is applied to the first strip closest to the grip and clean quartz sand with a grain size of 1-30 μm is applied using the sieve. The surplus sand is knocked-down. Glue is applied to the middle stripe using a small roller and clean quartz sand with the grain size of 1-20 μm is applied using the sieve. The surplus sand is knocked-down. The last stripe at the tip of the nail file is powdered with the quartz sand with the grain size of 1-15 μm. The surplus sand is knocked-down. The intermediate products are inserted into the fusing oven and baked for eight hours—of that, for twelve minutes at the temperature of up to 860° C. The finished nail file is rinsed with water after cooling.

Example 5

Four centimeter grip is marked on both sides of the FLOAT glass pane. Fusing glue is applied to the remaining surfaces using the roller. Each part of the glue surface is then powdered with glass sand of different grain size. The sand is fixed to the surface and the excessive sand is knocked-down. The pane is inserted into the fusing oven and baked for eight hours—of that, for ten minutes at the temperature of up to 850° C. After cooling, the glass panes are cut into strips which are then cut to the shape of nail files.

Example 6

Four centimeter grip is marked on both sides of the FLOAT glass pane. Wave shaped abrasive surface is marked on the remaining surface using paintbrush with glue and is powdered with quartz sand with the grain size of 1-20 μm. The bottom work surface is coated with glue using the roller and is powdered with clean quartz sand with a grain size of 1-30 μm. The pane is inserted into the fusing oven and baked for eight hours—of that, for ten minutes at the temperature of up to 850° C. After cooling, the glass panes are cut into strips which are then cut to the shape of nail files.

The invention claimed is:

1. A method for manufacturing a glass cosmetics product, said method comprising the sequential steps of:
   (a) providing a glass substrate having first and second sides,
   (b) marking at least one intended working surface on at least one of said first and second sides of said glass substrate,
   (c) applying to at least one marked working surface a coating of a fusing fixing glue,
   (d) powdering each fusing fixing glue coating on a marked working surface with a first layer of quartz sand having grain sizes of 1-500 μm,
   (e) removing surplus quartz sand from each fusing fixing glue coating to provide an intermediate glass article with temporarily fixed quartz sand on at least one marked working surface,
   (f) inserting said intermediate glass article in a glass fusing furnace,
   (g) baking said intermediate glass article in the glass fusing furnace at a temperature up to 900° C.,
   (h) cooling said intermediate glass article, and
   (i) rinsing said intermediate glass article to provide the glass cosmetics product.

2. The method according to claim 1, wherein in step (g) the intermediate glass article with temporarily fixed quartz sand on the at least one working surface is baked for up to 8 hours.

3. The method according to claim 1, wherein in step (g) the intermediate glass article with temporarily fixed quartz sand on the at least one working surface is baked at a temperature of 850-900° C. for 10-12 minutes.

4. The method according to claim 1, including between steps (b) and (c) step of sand blasting each marked working surface to be coated with a fusing fixing glue.

5. The method according to claim 1, including a step of decorating the working or a non-working surface having no fusing fixing glue coating thereon with glass frit after coating with glue.

6. The method according to claim 1, comprising between steps (d) and (e) a step of powdering a second layer of quartz sand on the first layer, the quartz sand in the second layer having different grain sizes compared to the quartz sand of said first layer.

7. The method according to claim 1, including in step (b) marking both said first and second sides of said glass substrate, and in step (d) powdering each of said first and second sides with quartz sand of different grain sizes.

8. The method according to claim 1, including steps of marking the working surface of the intermediate product on edges thereof and powdering with quartz sand.

9. The method according to claim 1, including steps of cutting the glass cosmetics product into strips and then trimming said strips into shapes of nail files.

* * * * *